United States Patent [19]
Katade et al.

[11] Patent Number: 5,326,306
[45] Date of Patent: Jul. 5, 1994

[54] METHOD AND AN APPARATUS THEREOF FOR CONTINUOUSLY PRODUCING A TUBULAR MANTLE MEAT

[75] Inventors: Toshiaki Katade; Tadanori Isayama, both of Fukuoka; Takeya Yoshioka, Tokyo, all of Japan

[73] Assignee: Nippon Suisan Kaisha, Ltd., Tokyo, Japan

[21] Appl. No.: 55,368

[22] Filed: May 3, 1993

[30] Foreign Application Priority Data

May 8, 1992 [JP] Japan .................. 4-143314

[51] Int. Cl.$^5$ .................. A22C 25/14; A22C 29/00
[52] U.S. Cl. .................. 452/12; 452/18
[58] Field of Search .................. 452/12, 18, 19, 106, 452/116

[56] References Cited

U.S. PATENT DOCUMENTS

| | | | |
|---|---|---|---|
| 3,947,921 | 4/1976 | Berk | 452/19 |
| 4,329,761 | 5/1982 | Olsson | 452/18 |
| 4,446,601 | 5/1984 | Carruthers | 452/12 |
| 4,545,092 | 10/1985 | Olsson | 452/12 |

FOREIGN PATENT DOCUMENTS

| | | | |
|---|---|---|---|
| 4131035 | 5/1992 | Japan | 452/12 |
| 4131038 | 5/1992 | Japan | 452/12 |

*Primary Examiner*—Willis Little
*Attorney, Agent, or Firm*—Sughrue, Mion, Zinn, Macpeak & Seas

[57] ABSTRACT

The invention is related to a method and an apparatus thereof of continuously producing a tubular mantle meat of the cuttlefish, in which the arms of the cuttlefish engaging with one of knife elements provided spaced at a certain distance on an endless chain running continuously is pulled toward a direction contrary to the run of said endless chain, thereby removing at least arms of the cuttlefish along with the viscera affixed to the arms preparing a tubular mantle and in which a skirt end of resultant mantle is aligned along a reference line and in which the skirt end, the fins and a portion of the tubular mantle adjacent to the fins, are cut in a state that the skirt end stands at an aligned position.

13 Claims, 14 Drawing Sheets

METHOD AND AN APPARATUS THEREOF FOR CONTINUOUSLY PRODUCING A TUBULAR MANTLE MEAT

BACKGROUND OF THE INVENTION

1. FIELD OF THE INVENTION

This invention is related to a method and an apparatus thereof for continuously producing a tubular mantle meat of cuttlefish without arms, viscera, fins and skin thereof. Especially, the invention is related to a method and an apparatus for continuously preparing the tubular mantle meat, whereby the cuttlefish right after catching and fishing can be provided with a continuous process comprising in sequence steps of arm removing, viscera removing, fin removing and skin striping-off, even if on the trawler, boat or ship subjected to pitching and rolling caused on rough sea waves, and furthermore the invention can carry out the continuous process of cuttlefish by utilizing the sea water ready to be obtainable on the sea.

In the specification, "tubular mantle meat" implies a cuttlefish meat prepared by removing arms, viscera and fins of cuttlefish.

2. PRIOR ART

Cuttlefish is one of the marine products and also a favorite of Japanese people.

In the case of utilizing the cuttlefish in the food manufacturing industry, it is general that the cuttlefish is divided into components with respective industrual use different each other and that the divided component after dividing the cuttlefish is utilized according to respective industrial demand use thereof, without the case of eating at a home the cuttlefish as Sashimi ( sliced meat). Namely, the fins consisting of one component of the cuttlefish may be utilized as a raw material of Chinese food. The tubular mantle meat prepared by peeling off the mantle skin may be utilized as a raw material of the deep-fried cuttlefish. The arms may be utilized as an additive to be added into Surimi or meat paste of cuttlefish.

Consequently, it is preferred, instead of freezing the cuttlefish right after catching thereof in a fashion that the cuttlefish stands with arms, viscera, fins and mantle skins, to divide the cuttlefish into components thereof, such as fins, arms and tubular mantle meat and to freeze the divided components, respectively, on the trawler, boat or ship. Each of the frozen components is supplied to the market. Doing so coincides with the market needs and is very advantageous in the sales aspect. The division of cuttlefish into components has to be made while the cuttlefish is fresh, that is, right after the catch thereof, on the trawler, fishing boat or ship.

However, the operation of separating cuttlefish on the trawler, boat or ship is subjected to pitching and rolling due to rough sea waves and hence is very dangerous and provides fishermen with labour along with high degree of fatigue, and there is a strong demand for automation of the operation of dividing the cuttlefish on the trawler, boat or ship. Nevertheless, no method or apparatus which can meet this demand has been proposed.

Up to date, such division of the cuttlefish on the boat, trawler or ship is carried out by manual operation. That is, the cuttlefish right after the catch thereof is subjected on the boat or the like to an arm removal manual operation, in which the arms are removed together with the viscera, by manual operation. However, to meat the market needs, the arm removal operation only is insufficient, and it is further required to cut off the fins and one portion of mantle affixed to the fins from the mantle of cuttlefish and then to peel off the skin so as to prepare a product of tubular mantle meat of the cuttlefish.

There are proposed machines and apparatuses for removing cuttlefish arm and viscera on the land. However, these machines and apparatuses can not be directly utilized for automating the operation for preparing the tubular mantle meat of the cuttlefish and also for withstanding pitching and rolling of the trawler, boat or ship due to rough sea waves, and in consequence considerable modification is necessary. That is, it is necessary to develop machines and apparatuses which permit a perfect automation of on-line process ranging from the arm removal operation to a preparation of tubular mantle meat of the cuttlefish. Presently proposed, however, are arm removing machines and apparatus only.

More specifically, Japanese Application Disclosure No. 158128/83 discloses an improvement of a arm/viscera removing apparatus which is disclosed in Japanese Patent Publication No. 21920/76. In the disclosed cuttlefish and viscera removing apparatus, a conveying plate puts between a pair of endless chains, and it has holding means to hold the arm of the cuttlefish. As the cuttlefish moves on the conveying plate and passes through between a pair of opposed guides plates, it is pressed from its opposite sides thereof by the guides plates so that it is spread upwardly. In this upwardly spread state, the joining portion by which arms are connected with the rear surface of the tubular mantle, is cut apart by using an arm removal tool, thus effecting the removal of the arms from the mantle of the cuttlefish.

Thus-obtained mantle drops by a movement in an oblique direction of the guide plates on a conduit, through which it is transferred to a sequent step.

Accordingly, the prior-art apparatus makes it possible to attain an automation of the sole arm removal operation which had heretofore been done manually.

On the contrary, the apparatus has defects, such that the apparatus is suitable for on-the-boat processing of the cuttlefish right after the catch thereof, because the apparatus has not an closed connection with processing steps following the arm removal operation. Consequently, the prior-art apparatus make it impossible to meet a requirement of an automation of all processing steps necessary for producing the tubular mantle meat by using the cuttlefish as a raw material.

Namely, the on-the-boat operation is subjected to violent pitching and rolling movements of the boat or ship caused depending on the state of the sea. The prior-art apparatus has a complicated structure and hence cannot provide the on-the-boat operation with its performance equal to that in the case when it operates on the land. Further, thus-obtained mantles are collected by manual operation and fed respectively by using the conduit, into the next processing step following the arm removal step. To this end, the prior-art apparatus can not be automatically coupled with an apparatus carrying out the next processing step.

In addition, Japanese Patent Application Disclosure No. 72839/91, describes an apparatus, which comprises a pair of gripping members retaining the mantle of cuttlefish therebetween, during the course of the arm removal operation, one member among pair gripping members being provided on the inner surface thereof with anti-slip means. The disclosed apparatus, however, is inferior in the degree of automation, compared to the above prior-art apparatus. In addition, like the above prior-art apparatus, the disclosed apparatus has problems in the coupling to the next processing step following the arm removal step.

SUMMARY OF THE INVENTION

An object of the invention is to dissolve above mentioned defects. Namely this invention provides a method of and an apparatus thereof with objects of achievement of a simple and durable construction with standing pitching and rolling of trawler or the like, of effective arm removal of the cuttlefish, and of a continuous production of the tubular mantle meat of the cuttlefish without arms, viscera and fins and skins thereof.

The invention is related to a method of continuously producing a tubular mantle meat of the cuttlefish subjected in sequence to steps comprising removing at least arms and viscera of the cuttlefish and cutting off at least fins of the cuttlefish, in which said method further comprises;
  a pulling step of pulling the arms of the cuttlefish engaging with one of knife elements provided spaced at a certain distance on an endless chain running continuously, toward a direction contrary to the run of said endless chain, thereby removing at lest arms of the cuttlefish along with the viscera affixed to the arms, to prepare a tubular mantle;
  a discharging step of moving the resultant tubular mantle in a state that it is engaged with said knife element, by using said endless chain running continuously and then discharging said tubular mantle at an exit end of said endless chain;
  an aligning step of bringing a skirt end of said tubular mantle in contact with an aligning member, thereby aligning said skirt end along a line parallel to said aligning member; and
  a cutting step of cutting off said skirt end, the fins and a portion of said tubular mantle adjacent to said fins, along cutting lines parallel to said aligning member.

Futhermore, the invention is related to an apparatus for continuously producting a tubular mantle meat of the cuttlefish in which said apparatus comprises;
  an arm removing unit including an endless chain running continuously and at least one knife element provided on said endless chain, said knife element permitting to support the cuttlefish in a state that the cuttlefish is engaged with said knife element and also cut off a joining portion of the arm connected with an inner face of the mantle of the cuttlefish, thereby removing said arms with a viscera of the cuttlefish and in consequence preparing said mantle;
  a feeding unit including a regulating plate and an opening provided on a portion thereof, with which opening fins and their neighborhood of the mantle are engaged, whereby said mantle makes a stop for a while;
  a pair of squeezing rollers provided on the exit of said feeding unit, said squeezing rollers serving to exert a pressure on said mantle therebetween, thereby removing the residual viscera remaining in said mantle;
  an aligning unit including a sliding member disposed in a direction obliquing along the lengthwise direction thereof and an aligning member provided on a lower end of said sliding member, said sliding member permitting a downward slide thereon of the mantle which flows out continuously from said squeezing roller, till a skirt end of the mantle is brought into contact with said aligning member, thereby preparing the mantle having the skirt end aligned with said aligning member; and
  a tubular mantle preparation unit including an upper and a lower belt systems and at least one rotary cutter, said upper and lower belt systems permitting therebetween a continuous movement of the mantle in a state that the skirt end of the mantle stands aligned, said rotary cutter being provided in relation to said lower belt system and also making a cutting of the mantle along lines parallel to the ligned skirt end of the mantle during said continuous movement thereof.

BRIEF EXPLANATIONS OF ATTACHED DRAWINGS

DETAILED EXPLANATION OF THE INVENTION

Preferable embodiment of the invention will be described in detail with reference to the drawings.

Figure 1:
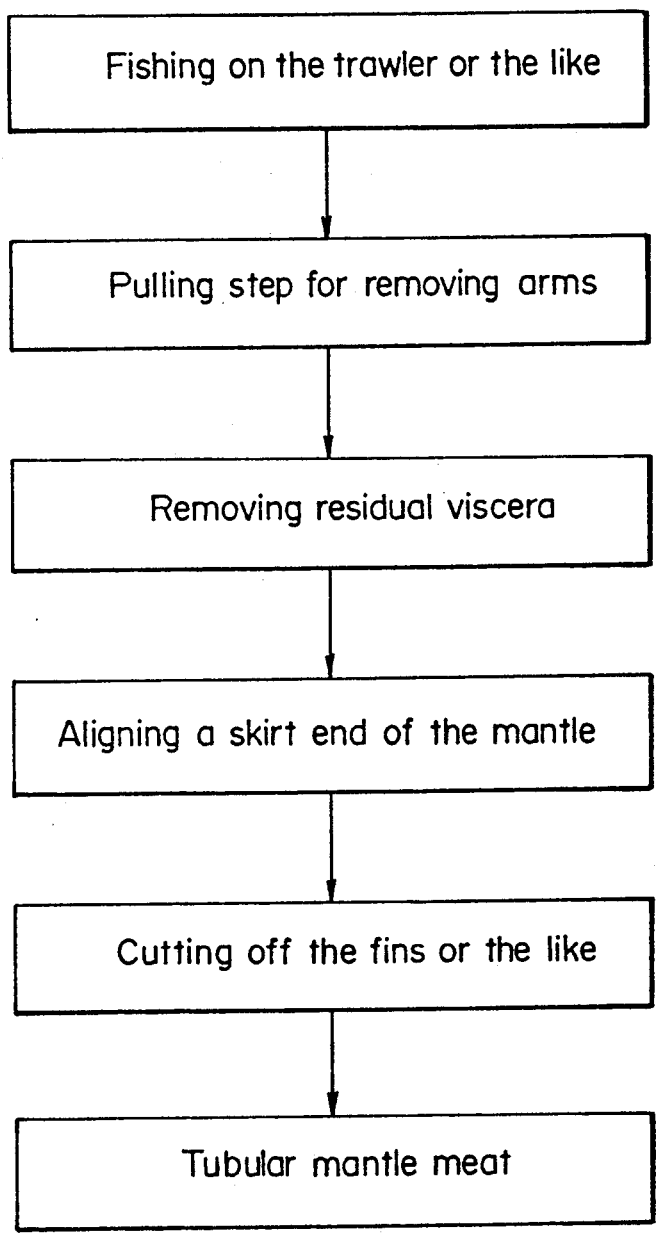
FIG. 1 is an explanation view showing one example of the invention process.

At first stage, as shown in FIG. 1, the cuttlefish immediately after the fishing and catching thereof is subjected on the trawler or the like to steps of removing arms along with viscera thereof, thereby resulted in a mantle and thereafter removing residual viscera remaining in the resultant mantle, by using a pair of squeezing rollers with opposite sides on which a pressure is exerted on the resultant mantle.

At secondary stage, the skirt end of the mantle of cuttlefish is brought into contact with an aligning member to achieve an alignment of the skirt end of the mantle. In this state, the fins and also a skirt end portion are cut away, and then the skin is peeled off, if necessary. In this way, the tubular mantle meat of cuttlefish is obtained.

Figure 2:
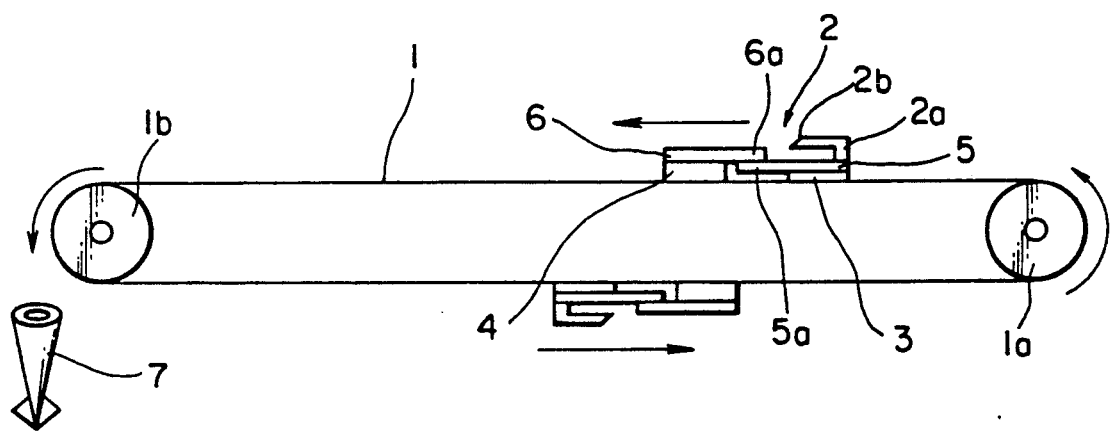
FIG. 2 is a schematic view showing one embodiment of an arm removal unit of this invention.

The removal of the arms is carried out by using a knife element 2 running continuously together with an endless chain 1, as shown in FIG. 2.

Figure 3:
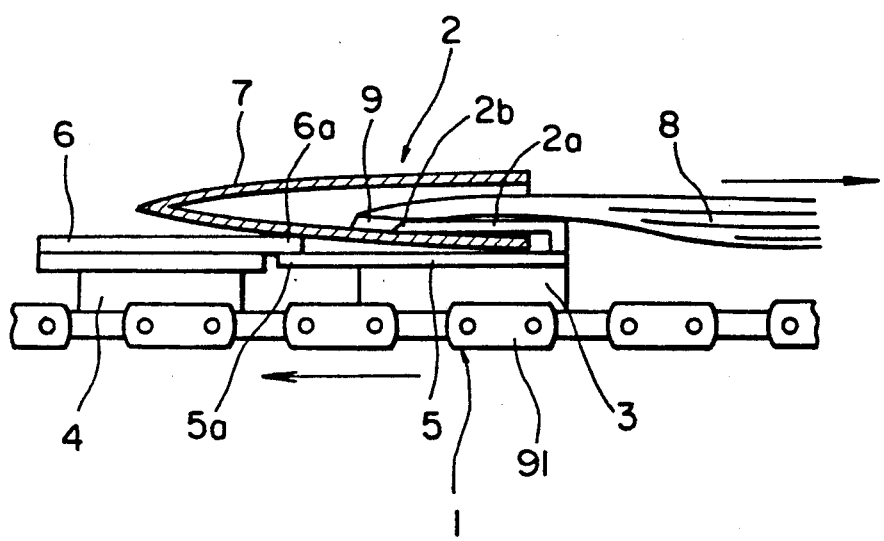
FIG. 3 is an explanation view with one sectional view thereof showing a fashion of removing arms of the cuttlefish by using a knife element affixed to an endless chain.

Namely, the endless chain 1 comprises a pair of parallel endless chains and is running continuously in the direction of arrows in FIG. 1. The endless chain 1 has at least one knife elements 2 spaced away at a certain interval. In detail, as shown in FIG. 3, the endless chain 1, like the conventional one, comprises a succession of links 91 coupled to one another, a base 3 carrying the knife element 2 thereon and a second base 4 adjacent to the base 3. It is possible to construct the two bases 3 and 4 such that they are integral with each other. For a continuous run of bases 3 and 4 in unison with the endless chain 1, however, the bases 3 and 4 are preferable to be separate from each other.

On the bases 3 and 4 are mounted a support plate 5 and a second support plate 6, respectively. The plate 6 has a tailing end 6a overlapped on a leading end 5a of the plate 5. The knife 2a is disposed upwardly on the neighborhood of the tailing end of the support plate 5 at a direction parallel to the plate 5. Specifically, the knife 2a has a channel-shaped form, and its edge or blade portion 2b extends in the direction of progress of the endless chain 1.

Since the support plate 5 and second support plate 6 are separated from each other, they can be turned smoothly around sprockets 1a and 1b, round which the endless chain 1 is passed and the cuttlefish can be supported from below by the two support plates irrespective of its size. Depending on the size of the cuttlefish to be processed, it is possible to use more than two support plates, for instance three or more support plates may be provided for processing the cuttlefish with large size.

Further, the provision of two or more separate support plates does not only have an effect of permitting smooth running of the endless chain at the turn. That is, since the tailing end 6a of the preceding second support plate 6 is overlapping the leading end 5a of the succeeding support plate 5, the mantle of cuttlefish engaging the knife 2 can be discharged smoothly and with a proper interval from the endless chain 1. As the two support plates 5 and 6 reaching the leading turning portion of the endless chain 1 are turned, the tailing end 6a of the second support plate 6 is raised obliquely and upwardly and then brought into contact with the underside of the mantle 7 of the cuttlefish engaging the knife 2. In this state of contact, the tailing end 6a of the second support plate 6 proceeds along an arc path on the leading turning portion of the endless chain 1, as well as running path of the endless chain 1. With the progress of tailing end 6a, the mantle 7 of cuttlefish is away from the knife 2a and thereafter falls continuously into a feeding unit 10 (shown in FIG. 1), which is described in detail later.

Further, when the two support plates 5 and 6 leave a space of a predetermined length to be adjusted, the mantle 7 of the cuttlefish is away from the knife 2a and then flows out at a predetermined period depending on the space left between two support plates 5 and 6. Consequently, mantles 7 can be fed periodically into the next processing units.

The knife 2a may be constructed in any fashion so as to cut away a joining portion 9 connecting with the inner surface of the mantle 7 and arms 8 and to have a secured engagement with the mantle 7 right after cutting off the joining portion 9 thereof. The best fashion of the knife 2a is in the channel-shaped form, as shown in FIGS. 2 and 3.

Figure 4:
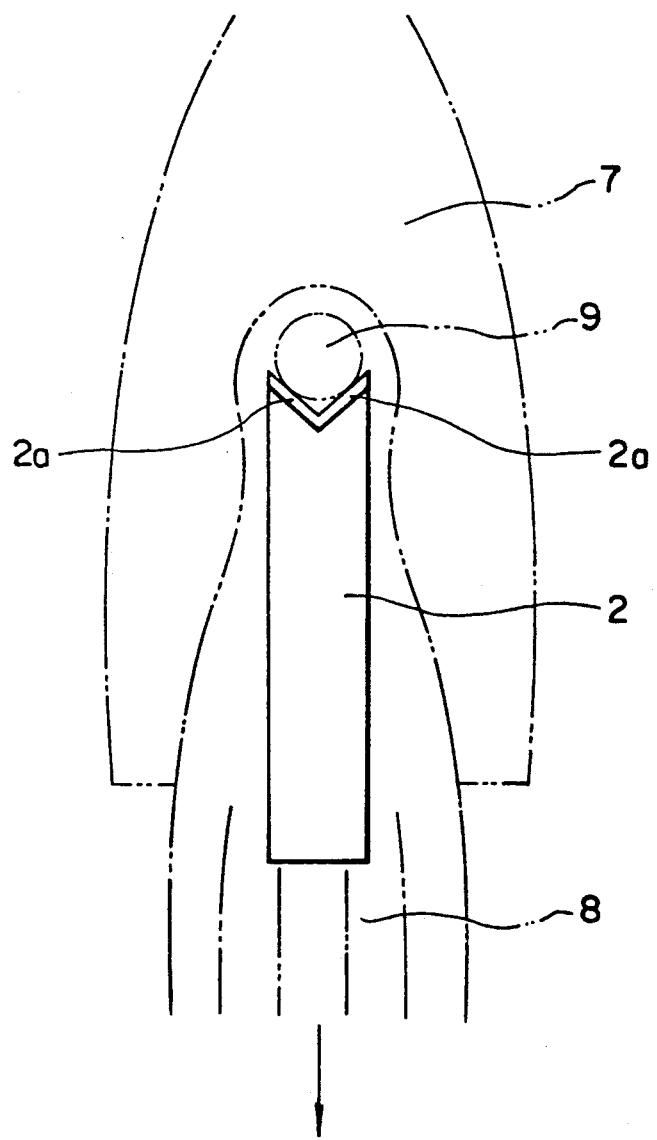
FIG. 4 is a plane view showing one embodiment of the knife element.

The knife 2a is preferably provided on the leading end with a blade 2b forking into a pair of oblique legs, as shown in FIG. 4. Namely, as described in detail later, by pulling the arms of the cuttlefish in the opposite direction to the progress of the endless chain 1, the forked shape blade 2b contacts the joining portion 9, and the joining portion 9 thus is smoothly cut apart as it slides on the inclined legs of the blade 2b. The blade 2b may be constructed in any fashion instead of the fork shape. However, with the fork-like shaped blade 2b, the joining portion 9 can be readily trapped even while the cuttlefish is moving continuously along with the endless chain 1. As described above, the mantle 7 of the cuttlefish after removal of arms 8 reaches the exit end of the endless chain 1, in the state thereof engaged with the knife 2a, and flows out into a feeding unit 10, such as a guide shoot, shown in FIG. 5.

The feeding unit makes a supply of the mantle 7 into pair of squeezing rollers 11 and 12. Between these rollers it is squeezed, whereby the residual viscera is removed. It is then allowed to fall onto and received by a receiving unit 13.

Figure 5:
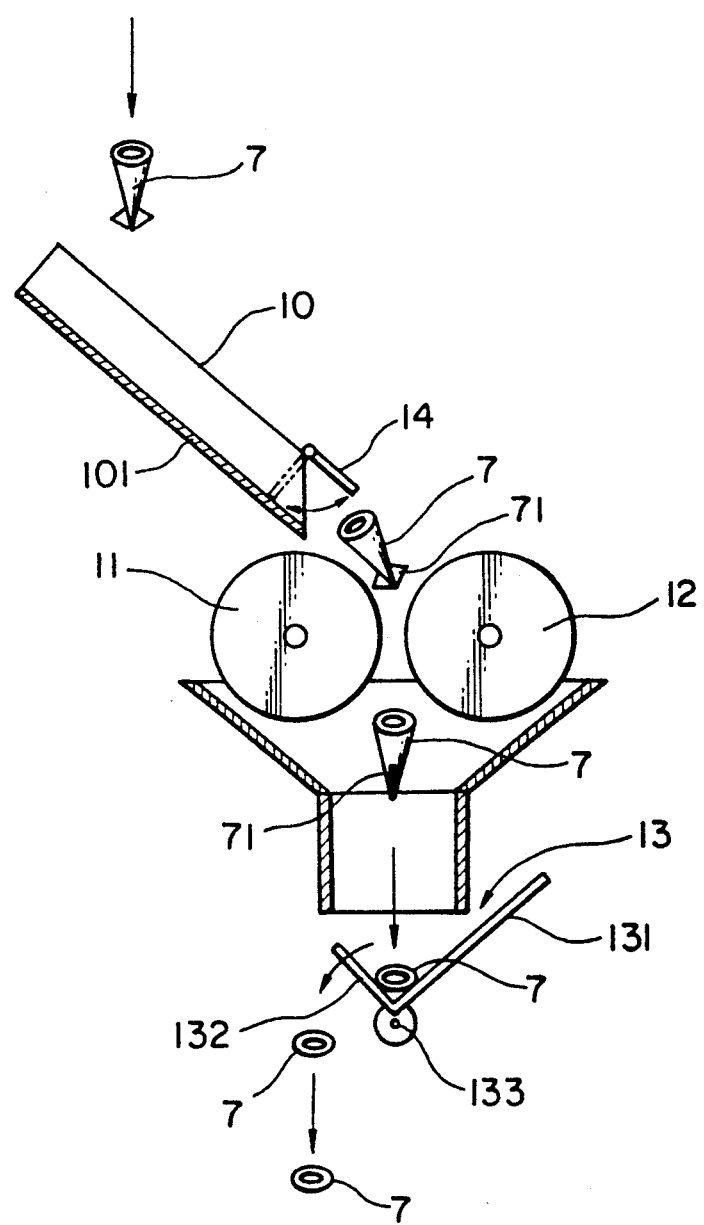
FIG. 5 is an explanation view with one sectional portion showing a viscera removal unit for removing a residual viscera remaining in a cuttlefish mantle immediately after the arm removal operation of the cuttlefish.
Figure 8:
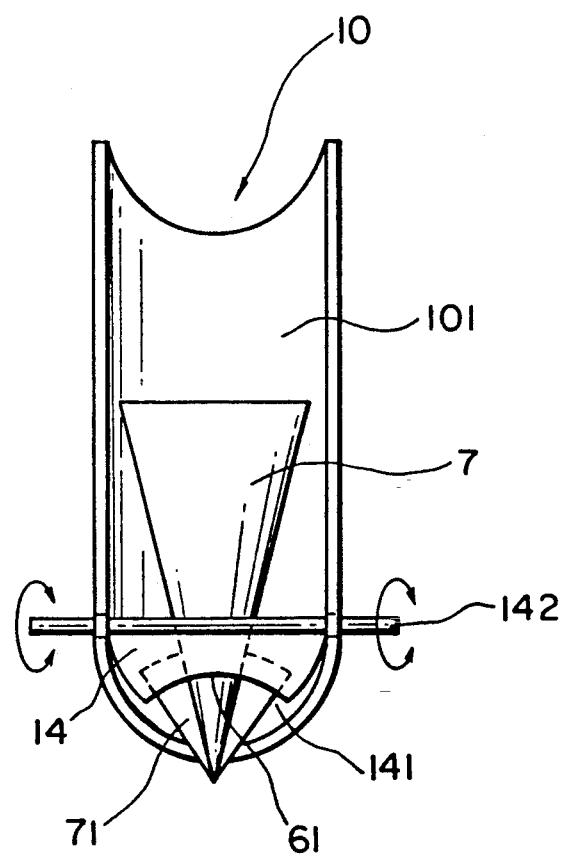
FIG. 8 is a perspective view showing a preferable embodiment of a feeding unit feeding the cuttlefish mantle into a mantle shirt end aligning unit of FIG. 9.

Namely the feeding unit 10 comprises a main body 101. As shown in detail in FIG. 8, the main body is preferably of a semi-cylindrical form and is provided at the outlet end thereof with a regulating plate 14. The regulating plate 14 has an upper end rotably mounted on the outlet end of the feeding unit 10, and it is provided on a portion contacted with the inner face of the feeding unit 10 with opening 141 (see FIG. 8) to be engaged with fins affixed to the mantle 7. Thus, when the mantle 7 of the cuttlefish flows out continuously from the endless chain 1 (see FIG. 2) in the direction of arrow in FIG. 5, it slides on the inner face of the main body 101, thereby reaching the regulating plate 14. At this time, the fins 71 affixed to the leading head of the mantle 7 enters and is engaged with the opening 141, whereby the mantle 7 makes a stop for a moment. The stop step has an effect of perfectly absorbing vibrations of the mantle 7 fed into the feeding unit 10. After such stop step of the mantle 7, the regulating plate 14 rotates about a pivot 142 thereof and opens, as shown in FIG. 5. As a result, the mantle 7 may make fins 71 to enter between the squeezing rollers 11 and 12. The position, at which the mantle 7 may enter, is always restricted within a certain area between rollers 11 and 12, and therefore the residual viscera remaining in the mantle 7 can be squeezed out smoothly and completely.

In addition to this, regulating plate 14 may be constructed in a fashion, such that it opens by a load exerted by the mantle 7 having fins 71 engaging with the opening 141 of the regulating plate 14, and that it returns and closes at the time of disengagement of fins 17 the opening 141. Of course, it is possible to open and close the regulating plate 14 by external force. Further, it is possible to open and close the regulating plate 14 in response to the detection of the engagement of the fins 71 with the opening 141.

Figure 6:
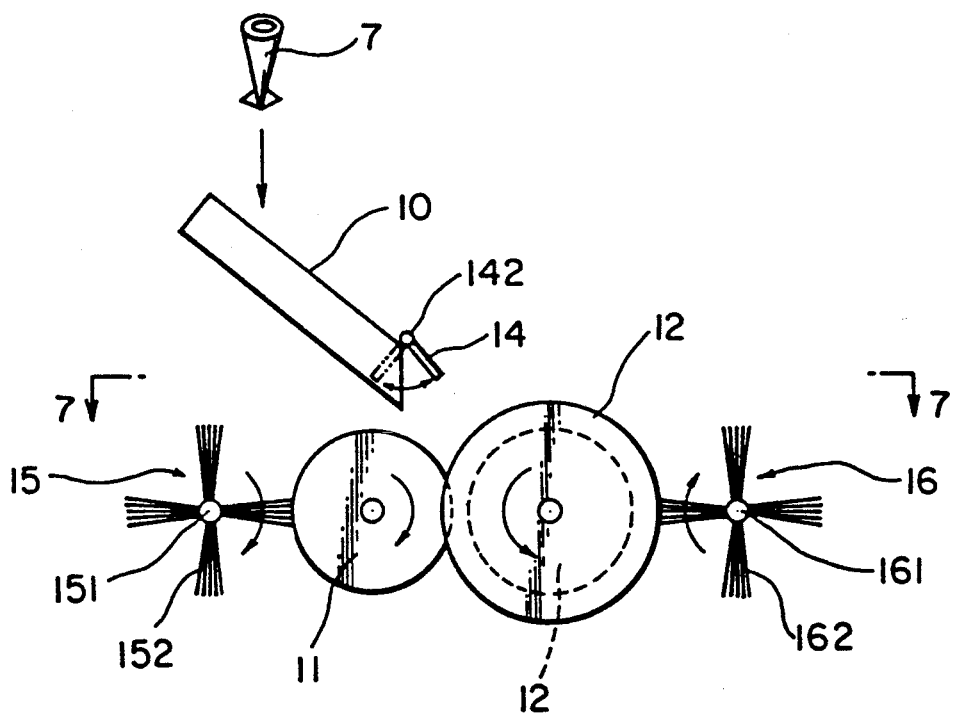
FIG. 6 is a front view showing a pair of squeezing rollers taking off the viscera from the cuttlefish mantle and also a removal unit taking off some materials sticked on the squeezing rollers.
Figure 7:
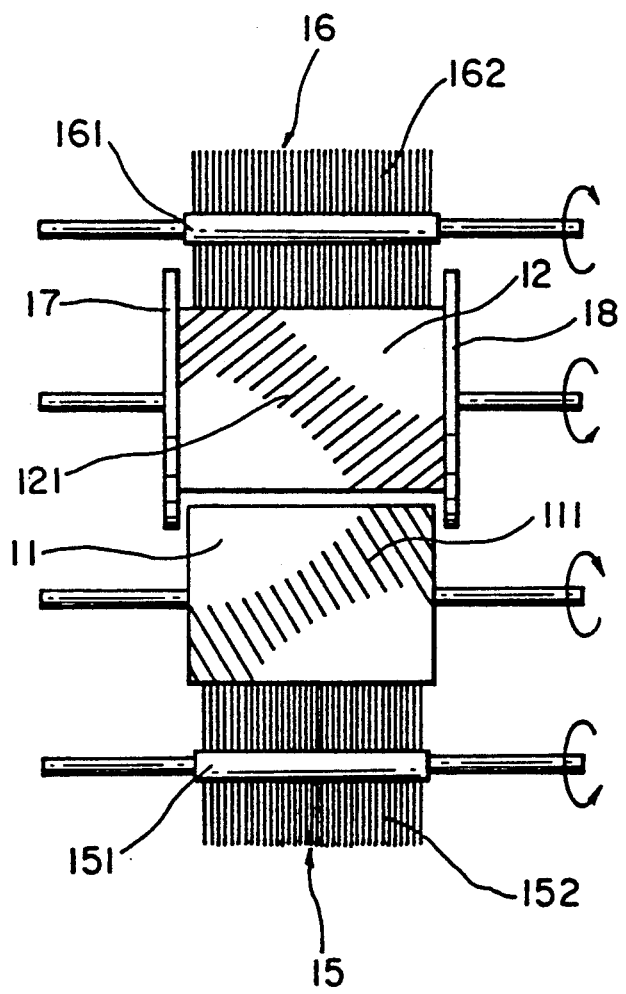
FIG. 7 is a plane view taken along a line A—A in FIG. 2.

The squeezing rollers 11 and 12 may, if desired, have respectively inclined or mesh-like notches 111 and 121 (see FIG. 7) formed over all or part of their surfaces to prevent the slip of the mantle 7 of the cuttlefish, and attachment removing units 15 and 16 are provided in a fashion such that they face the squeezing rollers 15 and 16, as shown in FIGS. 6 and 7.

Namely, the mantle 7 of cuttlefish is viscous surface and has the skin with a slidable property. When the mantle 7 of this structure is squeezed between the squeezing rollers 11 and 12, it may sometimes slip through so that the residual viscera may not all be squeezed out. However, with the notches 111 and 121 formed in at least part of the surfaces of the squeezing rollers 11 and 12, some frictional resistance is given to the mantle 7 to be squeezed. Thus, the mantle 7 does not slip, and the residual viscera can be removed smoothly. The residual viscera thus taken out is partly attached to the surfaces of the squeezing rollers 11 and 12. Particularly, with the notches 111 and 121 formed in the surfaces, the squeezed-out viscera enters the notches 111 and 121 and can not readily come out therefrom. The attachment removing unit 15 and 16 serve respectively to take out the viscera or the like from the surfaces of the squeezing rollers 11 and 12. Specifically, the attachment removing unit 15 and 16 comprises cores 151 and 161 having fiber-like members 152 and 162 extending radically therefrom. The fiber-like members 151 and 161 contact and in consequence clean the surfaces of the squeezing rollers 11 and 12 at all times. They can remove the viscera from the notches 11 and 12 as well. Thus, the mantle 7 of the cuttlefish can be squeezed without slip but in a predetermined orientation with respect to the squeezing rollers 11 and 12, so that it is possible to remove all the viscera.

The paired squeezing rollers 11 and 12 may be driven individually. However, it is suitable to drive only one of the two squeezing rollers, for instance the squeezing roller 12, while merely rotatably supporting the axis of the other squeezing roller, and couple the shafts of the two squeezing rollers 11 and 12 with a spring (not shown). With this arrangement, it is possible to squeeze out the residual viscera without causing damage to the meat tissues of the inserted mantle 7.

Of the two squeezing rollers 11 and 12, as shown in FIG. 7, the driving squeezing roller 12 has disk-like members 17 and 18 provided at the opposite ends 17 and 18, and a portion of the periphery of the other squeezing roller 11 is disposed between the two members 17 and 18 to prevent the mantle 7 itself to be squeezed out.

After the viscera removal operation, the mantle 7 is allowed to fall onto the receiving unit 13. The receiving unit 13, as shown in FIG. 5, has a downwardly inclined stationary plate 131 and a pivotable plate 132, which are connected pivotably with shaft 133, whereby the plate 132 may rotate in the direction arrow of FIG. 5.

Figure 9:
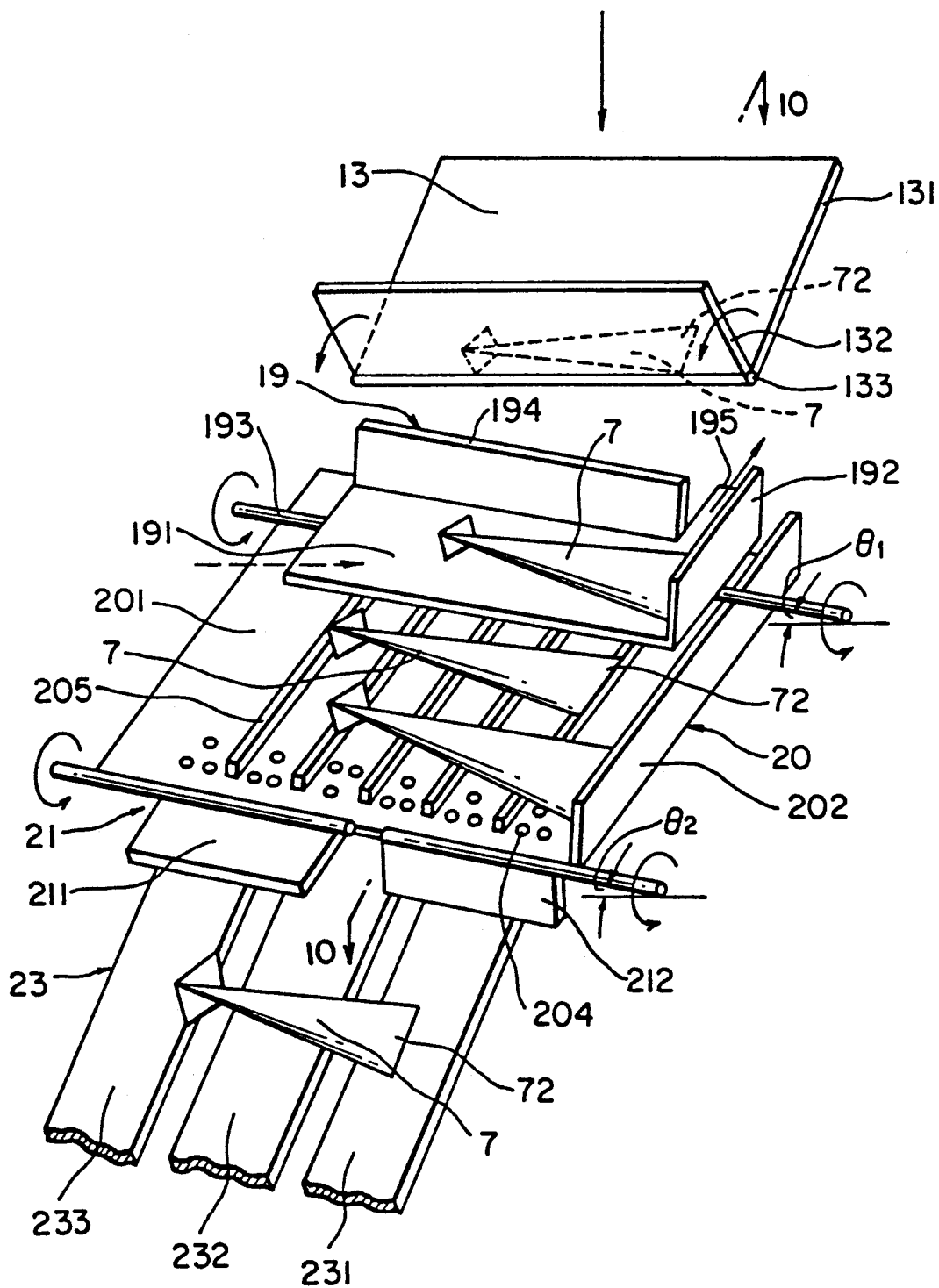
FIG. 9 is a perspective view showing a preferable embodiment of the unit aligning the mantle skirt end prior to cutting off fins and mantle head portions adjacent to the fins to prepare a tubular mantle meat without arms, viscera and fins thereof.

The stationary plate 131 and pivotable plate 132 are inclined along the longitudinal direction thereof toward one end thereof, as shown in FIG. 9. Thus, the mantle 7, which had failed down as a leading end of the fins 71 affixed thereto from the squeezing rollers 11 and 12, slides along the juncture between the stationary and pivotal members 131 and 132, so that the mantle 7 is made to be seated in a state parallel to the squeezing rollers 11 and 12. In this seating state of the mantle 7, the pivotable plate 132 is turned, thereby allowing the mantle 7 to fall down as shown in FIGS. 4, 5 and 7, and then transferred to the next station for sequent processing step.

The mantle 7 of cuttlefish from the squeezing rollers 11 and 12 is received by the receiving unit 13, in which it is seated as shown by dotted line in FIG. 9. Accordingly, when the pivotable plate 132 is turned in the direction of arrow of FIGS. 9 and 10, the mantle 7 falls into a skirt end aligning unit 19, in which an aligning of skirt end of the mantle 7 is carried out, as will be described later.

Namely, as shown in FIG. 9, the skirt end aligning unit 19 includes a sliding member 191, an aligning member 192 and a pivotable shaft 193. The shaft 193 is mounted on the rear surface of the sliding member 191 such that it extends in the lengthwise direction thereof. The skirt end 72 of the mantle 7 strikes the aligning member 192 and is thus aligned. When the skirt end 72 is aligned, the shaft 193 is rotated by a cam mechanism (not shown), thus causing rotation of the sliding member 191 in the direction of arrow of FIG. 9 by, for instance, about 90 degrees. Thus, the mantle 7 on the sliding member 191 is allowed to fall in a state that its skirt end 71 is aligned onto a transfer shoot 20 with transferring use.

The sliding member 191 is inclined downward by an inclination angle $\theta_1$ of 5 to 15 degrees, preferably about 10 degree, with respect to the horizontal. If the inclination angle is less than 5 degrees, the mantle 7 fails to slide smoothly toward the aligning member 192 even by the agency of a sea water jet. If the inclination angle $\theta_1$ is greater than 15 degrees, on the other hand, the skirt end 72 of the mantle 7 may be partly curved as its edge strikes the aligning 192, thus resulting in failure of the skirt end 72.

The aligning member 192 is provided at the end of the sliding member 191 such that it extends substantially at right angles to the shaft 193. It may be formed as an integral part of the sliding member 191 by bending the member 191, or it may be mounted as a separate member.

An edge member 194 is suitably provided on the sliding member 191 to keep the mantle 7 of cuttlefish from falling off the sliding member 191.

It is possible to provide a sea water source (not shown) near the tailing end of the sliding member 191 to thereby jetting the sea water from the source as shown by dashed arrow of FIG. 9.

Namely, the mantle 7 of cuttlefish fed into the unit 19 slides along on the sliding member 191, which is inclined downward toward its leading end, and then the skirt end 72 of the mantle 7 reaches the aligning member 192. At this case, its viscous skin of the mantle 7 is liable to attach itself to the surface of the sliding member 191 to provide a resistance against the sliding motion of the mantle 7 on the sliding member 191, so that the mantle 7 is liable to be bent instead of sliding smoothly. However, the sea water spreading on the sliding member 191 helps the smooth sliding of the mantle 7. While the mantle 7 of cuttlefish is deprived of the arms and thereof, it is often that a part of the viscera remains attached to the inner face of the mantle 7. The mantle 7 may be washed by using the sea water, and the sea water is drained together with the removed viscera through a draining port 195.

The mantle 7 of cuttlefish with the aligned skirt end 72 is fed to the transfer shoot 20 by the rotation of the shaft 193. The shoot 20 includes a shoot member 201 having an edge thereof provided with a guide 202 extending parallel to the aligning member 192. Along on the transfer shoot 20 the mantle 7 slides in a manner such that it puts in a laid-down position, i.e., in a position traversed substantially at right angles to the sliding path thereof. The shoot member 201 is inclined downward in the sliding direction by an inclination angle relative to the horizontal of 25 to 35 degrees (see FIG. 10). Further, the shoot member 201 is inclined in the direction at right angles to the sliding direction, i.e., in the length direction of the mantle 7, by 3 to 8 degrees, preferably about 5 degrees, with respect to the horizontal. With the shoot member 201 inclined by 3 to 8 degrees with respect to the horizontal, the tubular portion 7 runs along the shoot member 201 with its skirt end 72 in contact with the guide 202 to reach a stopper 21. In this way, the skirt end is held aligned.

The stopper 21 comprises at least two stopper members 211 and 212 which are driven independently.

Figure 11:
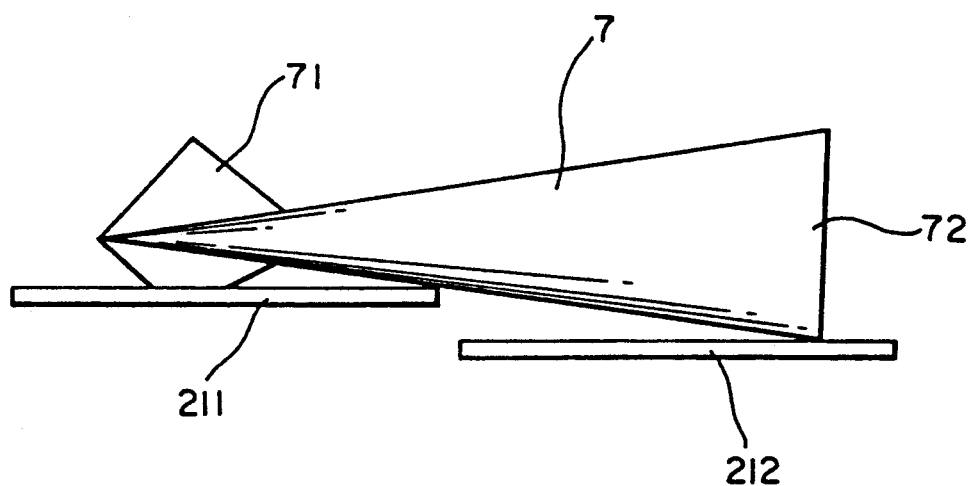
FIG. 11 is an explanation view showing a way how to move stoppers.

Namely, the mantle 7 of cuttlefish has a substantial isosceles triangular shape with its head portion having the fins 71, as shown in FIG. 11. Therefore, if the mantle 7 is received by a single stopper member, the aligned state of the skirt end of the mantle 7 is lost and the mantle 7 can no longer be transferred to the next processing step. For this reason, it is necessary to support one portions of the mantle 7 near the head portion with the fins 71 and the skirt end portions 72 independently, as shown in FIG. 11. The stopper members 211 and 212 are driven independently such that the stopper member 211 can support the neighborhood of the head portion with the fins 71 while the other support member 212 can support the neighborhood of the skirt end portion 72. With this arrangement of the stopper 21, the substantially isosceles triangular mantle 7 of cuttlefish can be transferred with a skirt end thereof held aligned to the next processing step.

Figure 10:
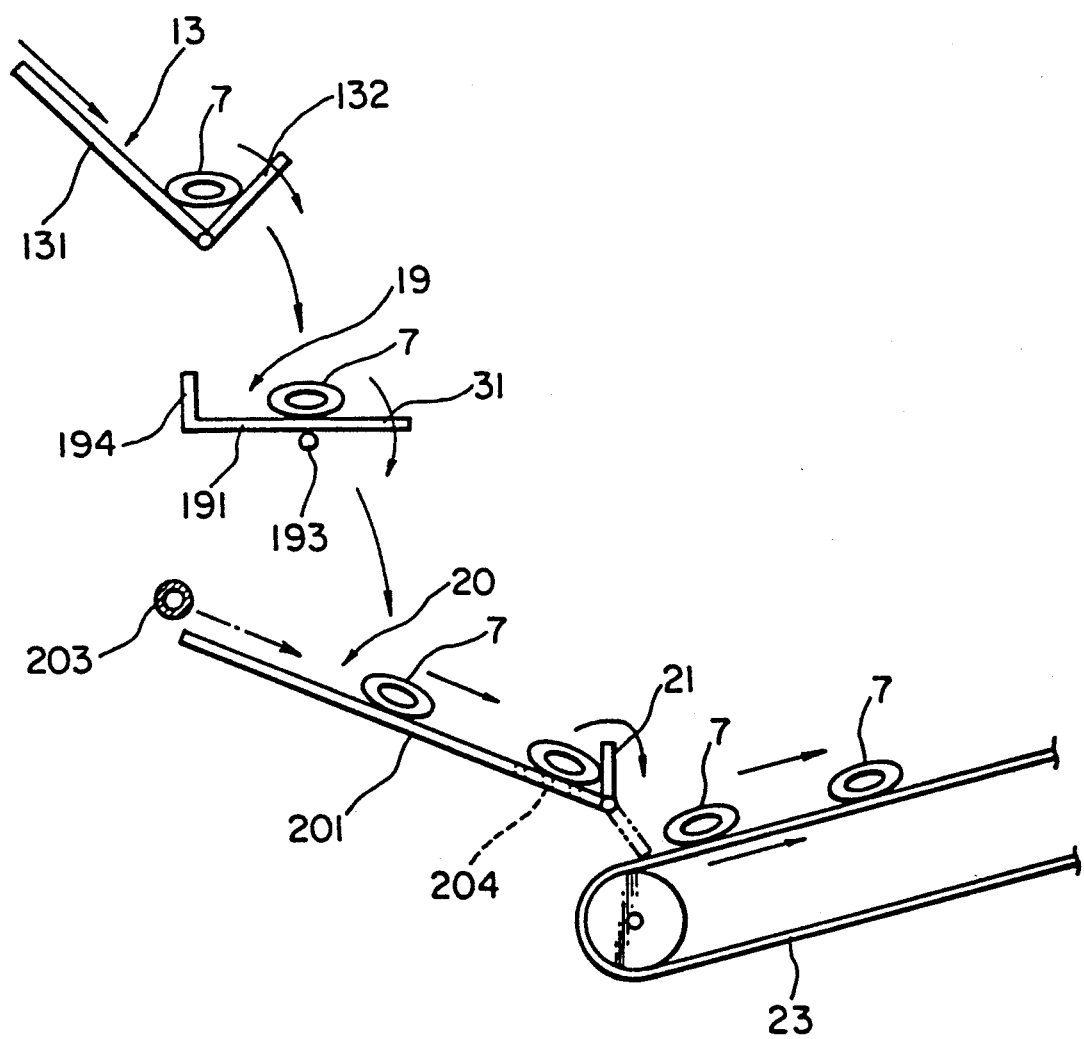
FIG. 10 is a sectional view taken along a line B—B in FIG. 9.

Further, as shown in FIG. 10, it is suitable to provide a sea water source 203 at a position adjacent to the upper end of the shoot member 201 to jet a sea water from the sea water source in a downwardly inclined direction, With this arrangement, the mantle 7 runs together with the sea water jet along on the shoot member 201 to reach the stopper members 211 and 212. During this time, the mantle 7 is washed by the sea water jet, and also the attached viscera is completely washed away. In this state, the mantle 7 is transferred to the next processing step. For jetting the sea water, it is suitable to provide in the lower end neighborhood thereof a plurality of holes 204 in the shoot member 201. Through these holes 204 sea water can flow out together with the removed viscera.

In addition to this, as shown in FIG. 9, a plurality of bar-like members 205 spaced apart each other are suitably provided on the surface of the shoot member 201, in a manner, such that they extend in the direction of running path of the mantle 7, i.e., in the direction substantially parallel to the guide 202. The mantle 7 of cuttlefish can run smoothly along the bar-like members 205. When the cuttlefish is suitably subjected to the pressing right after the catch of the cuttlefish on the trawler, for instance, bar-like members 205 can sufficiently absorb the undersirable vibration of the unit 20. Thus the mantle 7 can run along on the shoot member 201 smoothly while the skirt end 72 held as it stands aligned.

Figure 12:
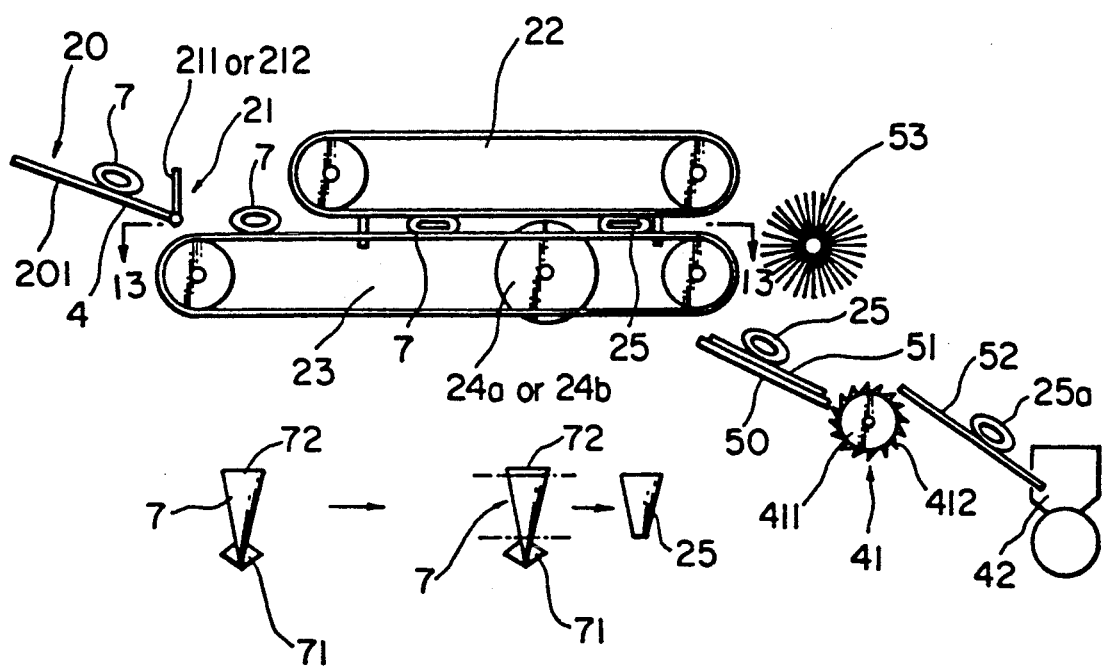
FIG. 12 is an explanation view showing a tubular mantle meat forming unit which continuous cuts off the tubular mantle meat along the aligned skirt end thereof.

At cutting step of the mantle 7, as shown in FIG. 12, the mantle 7, which is fed out from the shoot member 201, enters a tubular mantle preparation unit as its skirt end stands aligned by using the two stopper members 211 and 212. The tubular mantle preparation unit includes an upper and a lower movable belt system 22 and 23. The mantle 7 entering the lower movable belt system 23, has not arms and viscera thereof, but has the fins 72 as shown in FIG. 12. The mantle 7 is supplied to the lower movable belt system 23, as its skirt end 71 stands aligned, via the shoot member 201.

The upper movable belt system 22 is vertically movable relative to the lower movable belt system 23, in a manner such that the former belt system 22 may be approached to or spaced from the later belt system 23. The vertical distance between two belt systems 22 and 23 may be adjusted depending on the thickness of the mantle 7 of the cuttlefish to be processed. During the course of transference of the mantle 7 to the downstream side in a state interposing the mantle 7 between the upper and lower movable belt systems 22 and 23, the mantle 7 passes through two rotary cutters 24a and 24b (see FIG. 13) provided on the lower movable belt system 23, thereby cutting off the fins 71, the mantle head portion affixed with the fins 71 and the skirt end 72, as shown by phantom lines in FIG. 12.

As a result, a tubular mantle with a skin thereon can be obtained and flows out through an inclined shoot 26 connected with the exit of the movable belt systems 22 and 23.

In addition, the rotary cutters 241 and 242 may be driven by a drive belt 27 connected with a drive motor (not shown).

At the final stage, the tubular mantle 25 with the skin thereon is passed through a skin peeling unit 41, for peeling off the skin of the tubular mantle 25. As shown above, the skin on the tubular mantle 25 may be peeled off by the unit 41, thereby preparing a tubular mantle meat 25a without arms, viscera, fins and fins thereof, which meat 25a is a final product prepared by this invention.

Thereafter, the tubular mantle meat 25a enters a hopper 42 via the shoot 52. Beneath the hopper 52, an ejector (not shown) utilizing sea water is installed, and by utilizing this sea water jet, the tubular mantle meat 25a is conveyed to a predetermined site; for instance it is accommodated in a vessel in the boat.

Figure 14:
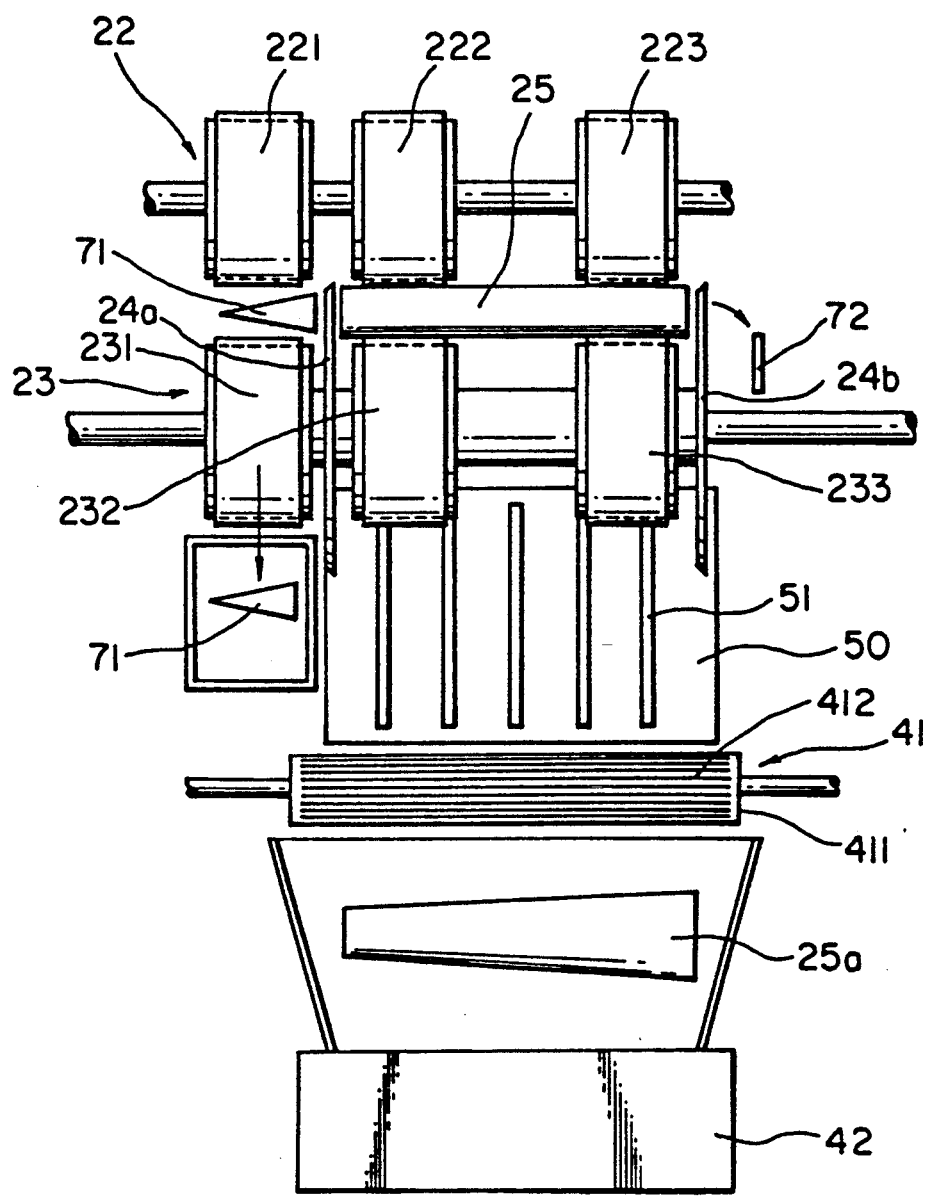
FIG. 14 is a plane view showing a discharge side of the tubular mantle meat making apparatus according to this invention.

Futhermore, the upper movable belt system 22, as shown in FIG. 14, comprises three endless conveyer belts 221 to 223. Likewise, the lower movable belt system 23 comprises endless conveyer belts. The upper movable belt system 22 does not always need a provision with three conveyer belts, that is, it may comprise a single conveyer belt. On the other hand, the lower movable belt system 23 has to comprise at least two conveyer belts. However, it must not essentially comprise two or three the conveyer belts, but it may comprise more than three conveyer belts. Further, each conveyer belt may be replaced with a chain or other movable members.

Figure 13:
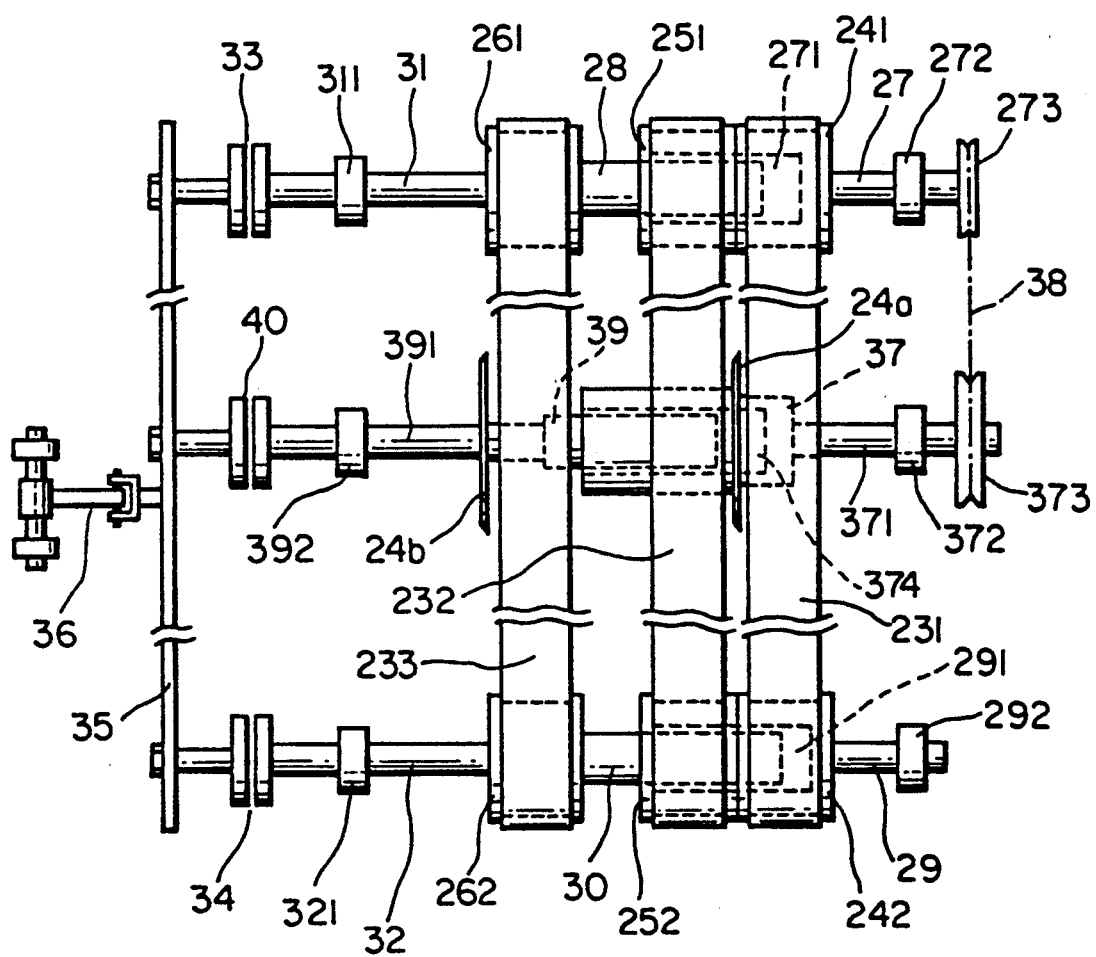
FIG. 13 is a plane view taken along a line C—C in FIG. 12.

In the lower movable belt 23, a plurality of, i.e., three in FIGS. 13 and 14, conveyers 231 to 233 extend parallel to one another. Of these conveyers the conveyers 231 and 233 can be displaced by parallel displacement by a parallel displacement unit as will be described later.

Namely the conveyers 231 to 233 are supported at their opposite ends by rollers 241 and 242, 251 and 252, and 261 and 262, respectively. The conveyers 231 and 232 are passed round rollers 241 and 251, to which is coupled a shaft 27. The shaft 27 is provided therein with a concentric opening 271, to be fitted by a shaft 28, as described later. The shaft 27 is supported by a bearing 272 and driven by a drive pulley 273 provided at the end thereof. The conveyers 241 and 251 are also passed round rollers 242 and 252, among which roller 242 is coupled to a shaft 29. The shaft 29, as will be described later, has a concentric bore 291, in which a shaft 30 is fitted, and is supported in a rotatable fashion by a bearing 292.

The roller 261 carrying the conveyer 233 is provided on the opposite sides thereof with shaft 28 and 31. The shaft 28 is fitted in a concentric bore 271 of the shaft 27. Likewise, shafts 30 and 32 are coupled to the opposite sides of the roller 262, round which the conveyer 233 is passed, the shaft 30 being fitted in a concentric bore 291 of the shaft 39.

With this arrangement, the conveyers 231 and 232 are made integral while the shafts 28 and 30 are fitted in the concentric bores 271 and 291 of the shafts 27 and 29. Therefore, conveyer the 233 may be displaced relatively relative to the conveyers 231 and 232, after releasing an engagement by keys (not shown) or the like securing these components.

The shaft 31 which is coaxial with the shafts 27 and 28, is supported in a bearing 311 and coupled to a coupling means 33, and the shaft 32 which is coaxial with the shafts 29 and 30 is coupled to a coupling means 34 via a bearing 321. The coupling means 33 and 34 are for coupling to a drive section of a parallel displacement unit, which is displaced later. The drive section has any structure, for instance as shown in FIG. 13.

More specifically, the drive section of the parallel displacement unit comprises a connecting member 35, a link mechanism 36 and a driving unit (not shown) such as a liquid cylinder. The connecting member 35 is provided at the opposite ends thereof with the coupling means 34 and 33. When adjusting the distance to displace the conveyer 233 according to the size and, the length of the cuttlefish, the conveyer 233 is displaced relative to the conveyers 231 and 232. In detail, the drive section is coupled to the shafts 31 and 32 via the coupling means 33 and 34, and then the keys are removed from the shafts 31 and 32, and the conveyer 233 is displaced. In this way, the conveyer 233 can be readily displaced by parallel displacement unit.

At least two rotary cutters 24a and 24b are provided in relation to the conveyers 231 to 233. These rotary cutters 24a and 24b may have a conventional structure, or they may be replaced with other cutting means. It is further possible depending on the purpose to provide a single, instead of two rotary cutter.

Namely, the two rotary cutters 24a and 24b are arranged such that they can be moved in a relation to the relative movement of the conveyers 231 to 233. To this end, the rotary cutter 24a is secured on the shaft 37, which is in turn coupled through the rotary shaft 371 and bearing 372 to a pulley 373 to be driven from a drive pulley 273 via a chain 38 or the like. The shaft 37 has a concentric bore 374, in which is fitted the shaft 39 which is in turn provided with the other rotary cutter 241. When the cutter is driven, the shafts 37 and 38 are made integral with a key (not shown), for instance. With this arrangement, the distance between the rotary cutters 24a and 24b can be adjusted by a displacement of the shaft 39 carrying the rotary cutter 24b with respect to the shaft 37 carrying the rotary cutter 24a mounted thereon.

By coupling the rotary cutter 42b, the shaft 391, and bearing 392 to the connecting member 35 via coupling means 40, the relative positions of the two rotary cutters 42a and 42b can be adjusted in relation to the movement of the conveyers 231 to 233.

The inclined shoot 50 serving to feed tubular mantle 25 to the skin peeling unit 41, as shown in FIG. 14, has its surface provided with bar-like members 51 extending in the direction of running of the tubular mantle. With this arrangement, tubular mantle 25 can enter the skin peeling unit 41 as it stands laid and aligned.

The skin peeling unit 41 has a rotary cylinder 411 having cutting blades 412, and the contact of the blades 412 with skin of the tubular mantle 25 can make a peeling of the skin from the tubular mantle 25.

The tubular mantle 25 passes through the skin peeling unit 41, thereby resulted in the tubular mantle meat 25a. The tubular mantle meat 25a enters a hopper 42 via an inclined shoot 52 and is hence supplied by the sea water to a predetermined location, for instance a vessel in the boat, ship or the like.

At the discharge end of the lower movable belt system 23, a rotary brush element 52 is provided to remove attached viscera or the like from the conveyers 231 to 233 to prevent the disturbance of the alignment of the tubular mantle 25 due to the residual viscera or the like.

What is claimed is:

1. A method of continuously producing a tubular mantle meat of the cuttlefish subjected in sequence to steps comprising removing at least arms and viscera of the cuttlefish and cutting off at least fins of the cuttlefish, in which said method further comprises;

a pulling step of pulling the arms of the cuttlefish engaging with one of knife elements provided spaced at a certain distance on an endless chain running continuously toward a direction contrary to the run of said endless chain, thereby removing at least arms of the cuttlefish along with the viscera affixed to the arms, to prepare a tubular mantle;

a discharging step of moving the resultant tubular mantle in a state that it is engaged with said knife element, by using said endless chain running continuously and then discharging said tubular mantle at an exit end of said endless chain;

an aligning step of bringing a skirt end of said tubular mantle into contact with an aligning member, thereby aligning said skirt end along a line parallel to said aligning member; and a cutting step of cutting off said skirt end, the fins and a portion of said tubular mantle adjacent to said fins, along cutting lines parallel to said aligning member.

2. A method according to claim 1, in which said method further comprises a squeezing step of transferring said tubular mantle, by utilizing a jet of sea water or the like, to a pair of squeezing rollers, between which a pressure is exerted on said tubular mantle, thereby removing a residual viscera remaining in said tubular mantle passing through after said discharging step.

3. A method according to claim 1, in which said method further comprises a step of feeding said tubular mantle passing through said aligning step into said cutting step, in such a state that said tubular mantle are supported in a state that the fins and the skirt end thereof are supported respectively.

4. A method according to claim 1, in which said method further comprises a peeling step of peeling off a skin of said tubular mantle passing through said cutting step, thereby preparing said tubular mantle meat without arms, viscera, skin or the like, and a transferring step of transferring the resultant tubular mantle meat to a hatch or hold of trawler, boat or ship, by utilizing a jet of sea water.

5. An apparatus for continuously producing a tubular mantle meat of the cuttlefish in which said apparatus comprises;

an arm removing unit including an endless chain running continuously and at least one knife element provided on said endless chain, said knife element permitting to support the cuttlefish in a state that the cuttlefish is engaged with said knife element and also cut off a joining portion of the arm connected with an inner face of the mantle of the cuttlefish, thereby removing said arms with a viscera of the cuttlefish and in consequence preparing said mantle;

a feeding unit including a regulating plate and an opening provided on a portion thereof, with which opening fins and their neighboring/portion of the mantle are engaged, whereby said mantle makes a stop for a while;

a pair of squeezing rollers provided on the exit of said feeding unit, said squeezing rollers serving to exert a pressure on said mantle therebetween, thereby removing the residual viscera remaining in said mantle;

an aligning unit including a sliding member disposed in a direction obliquing along the lengthwise direction thereof and an aligning member provided on a lower end of said sliding member, said sliding member permitting a downward slide thereon of the mantle which flows out continuously from said squeezing rollers, till a skirt end of the mantle is brought into contact with said aligning member, thereby preparing the mantle having the skirt end aligned with said aligning member; and a tubular mantle preparation unit including an upper and a lower belt systems and at least one rotary cutter, said upper and lower belt systems permitting therebetween a continuous movement of the mantle in a state that the skirt end of the mantle stands aligned, said rotary cutter being provided in relation to said lower belt system and also making a cutting of the mantle along lines parallel to the aligned skirt end of the mantle during said continuous movement thereof.

6. An apparatus according to claim 5, in which said knife element includes a channel-shaped knife with edge thereof extending in the direction of progress of said endless chain.

7. An apparatus according to claim 5, in which said knife element is disposed on a support plate serving to support thereon the cuttlefish and in which said support plate is provided via a base on said endless chain.

8. An apparatus according to claim 5, in which two support plates adjacent to one another are provided via bases on said endless chain and in which one support plate has a tailing end overlapped with a leading end of other support plate.

9. An apparatus according to claim 5, in which said apparatus further comprises an attachment removing unit disposed at a place adjoining said squeezing roller, said attachment removing unit serving to remove a viscera or the like adhering on said squeezing rollers.

10. An apparatus according to claim 5, in which said lower belt system includes a plurality of conveyers disposed in a movable manner in a direction parallel to each other, and in which two or more rotary cutters are provided in relation to said conveyers and in which said lower belt system includes a parallel displacement unit serving to make a parallel displacement of one conveyer relative to other conveyer and also to make a parallel displacement of the rotary cutters relative to each of the conveyers.

11. An apparatus according to claim 5 in which said apparatus further comprises an elevating unit serving to move upwardly and downwardly said upper belt system in a manner that said upper and lower belt systems are approached or spaced from one another.

12. An apparatus according to claim 5, in which said upper and lower belt systems are provided at an exit thereof with a rotary brush element permitting a removal of viscera or the like adhering thereon.

13. An apparatus according to claim 5, in which said lower belt system is provided at the exit thereof with an inclined shoot obliquing downwardly, said inclined shoot having thereon bar-like members directed toward a length-wise direction thereof.

* * * * *